United States Patent [19]

Annestedt, Sr.

[11] Patent Number: 4,929,000
[45] Date of Patent: May 29, 1990

[54] MULTIPLE WALLED CHIMNEY
[75] Inventor: James W. Annestedt, Sr., Memphis, Tenn.
[73] Assignee: American Metal Products Company, Los Angeles, Calif.
[21] Appl. No.: 279,379
[22] Filed: Dec. 2, 1988
[51] Int. Cl.[5] ............................................. F16L 39/00
[52] U.S. Cl. ................................. 285/133.1; 285/367; 285/373; 285/419; 285/424; 138/148
[58] Field of Search .................... 285/47, 133.1, 133.2, 285/424, 367, 373, 419, 904, 187; 138/148, 149, DIG. 10

[56] References Cited
U.S. PATENT DOCUMENTS

| | | |
|---|---|---|
| 360,782 | 4/1887 | Ober ..................................... 138/148 |
| 1,824,422 | 9/1931 | Badger . |
| 2,362,557 | 11/1944 | Jahns . |
| 2,451,587 | 10/1948 | Taylor . |
| 2,679,867 | 6/1954 | Epstein . |
| 2,761,949 | 9/1956 | Colton . |
| 2,850,264 | 9/1958 | Grable . |
| 2,894,537 | 7/1959 | Carr . |
| 2,930,407 | 3/1960 | Conley et al. . |
| 3,146,005 | 8/1964 | Peyton . |
| 3,170,544 | 2/1965 | Kinkead et al. . |
| 3,208,539 | 9/1965 | Henderson . |
| 3,226,135 | 12/1965 | Epstein . |
| 3,427,051 | 2/1969 | White et al. . |
| 3,544,135 | 12/1970 | Hoerner . |
| 3,574,357 | 4/1971 | Tirgouiste et al. . |
| 3,583,730 | 6/1971 | Kozlowski . |
| 3,889,715 | 6/1975 | Lilja et al. . |
| 3,902,744 | 9/1975 | Stone . |
| 4,029,343 | 6/1977 | Stone . |
| 4,029,344 | 6/1977 | Stone . |
| 4,432,485 | 2/1984 | Smith ................................. 138/148 |
| 4,720,125 | 1/1988 | Ream et al. ........................... 285/47 |
| 4,781,402 | 11/1988 | Ream et al. ........................... 285/47 |

FOREIGN PATENT DOCUMENTS

| | | |
|---|---|---|
| 679434 | 2/1964 | Canada . |
| 2322241 | 11/1974 | Fed. Rep. of Germany ........ 285/47 |
| 2844223 | 4/1980 | Fed. Rep. of Germany ........ 285/47 |

Primary Examiner—Randolph A. Reese
Assistant Examiner—Carol Bordas
Attorney, Agent, or Firm—Edgar A. Zarins; Malcolm L. Sutherland

[57] ABSTRACT

A multiple walled metal chimney formed of a plurality of axially joined chimney sections each of which utilizes positionally captured spacer rings. Joint clamps are used to connect the chimney sections for formation of the complete chimney conduit. The spacer rings are positionally captured between annular shoulders formed in the inner and outer walls of the chimney sections to eliminate welding of the rings. The rings may include an expansion joint to allow circumferential expansion and contraction of the ring with the walls.

25 Claims, 4 Drawing Sheets

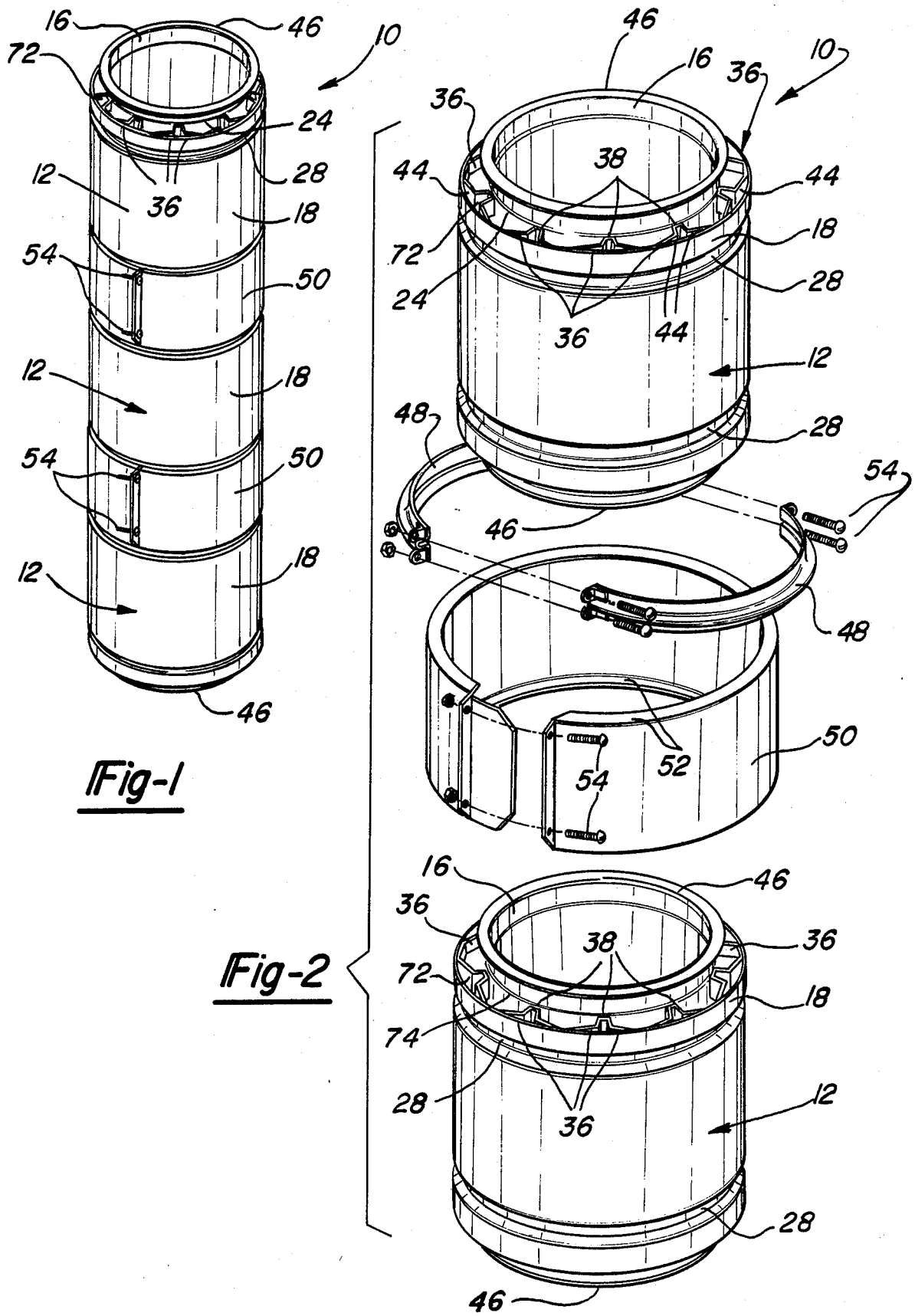

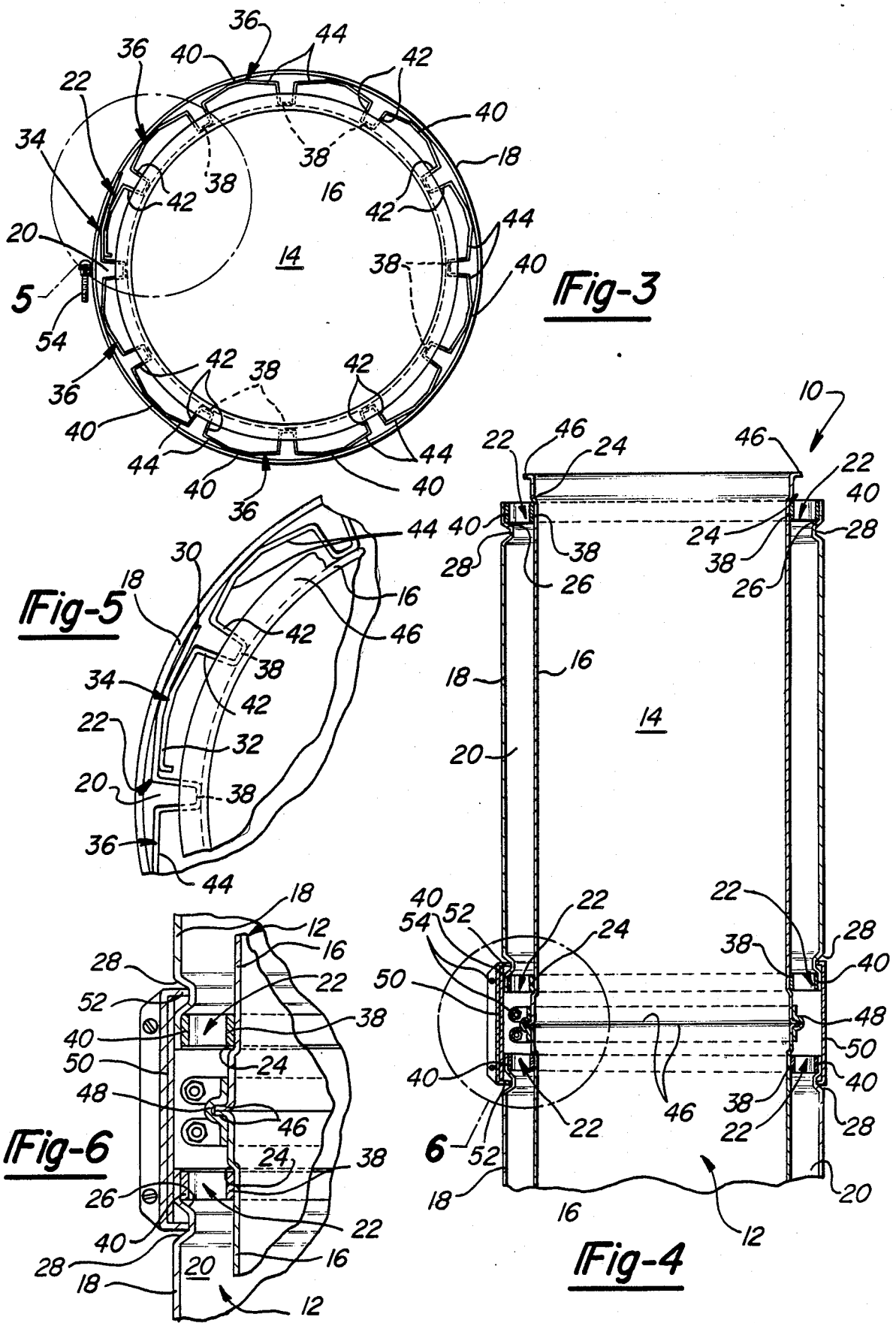

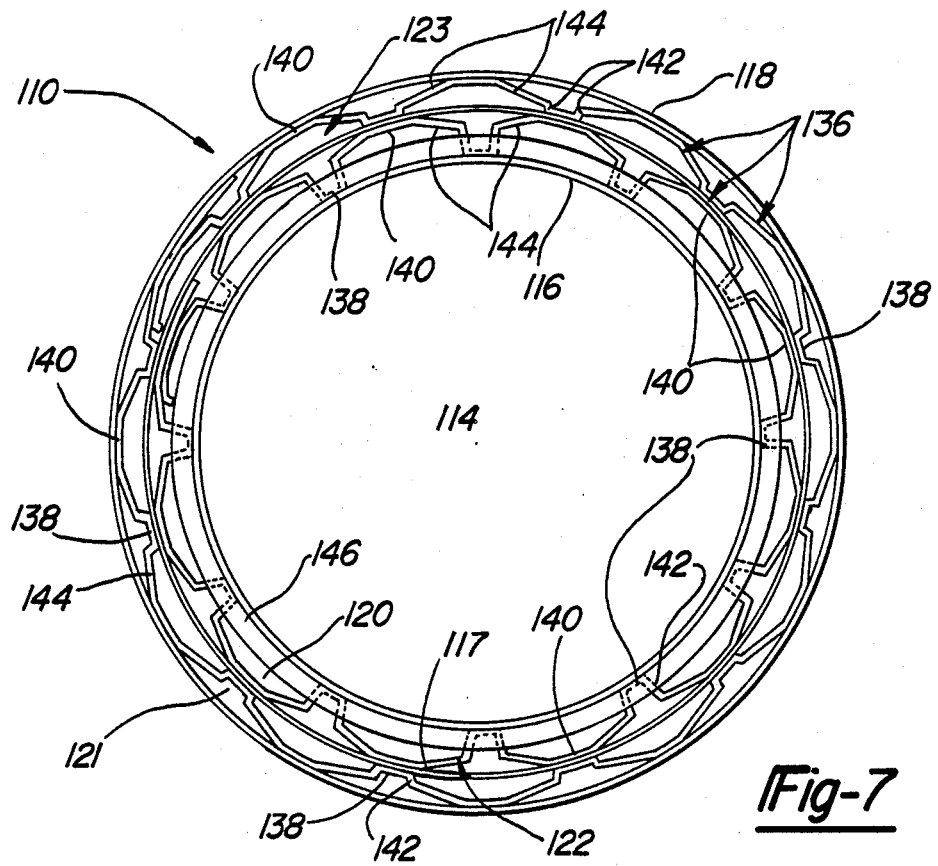
_Fig-7_
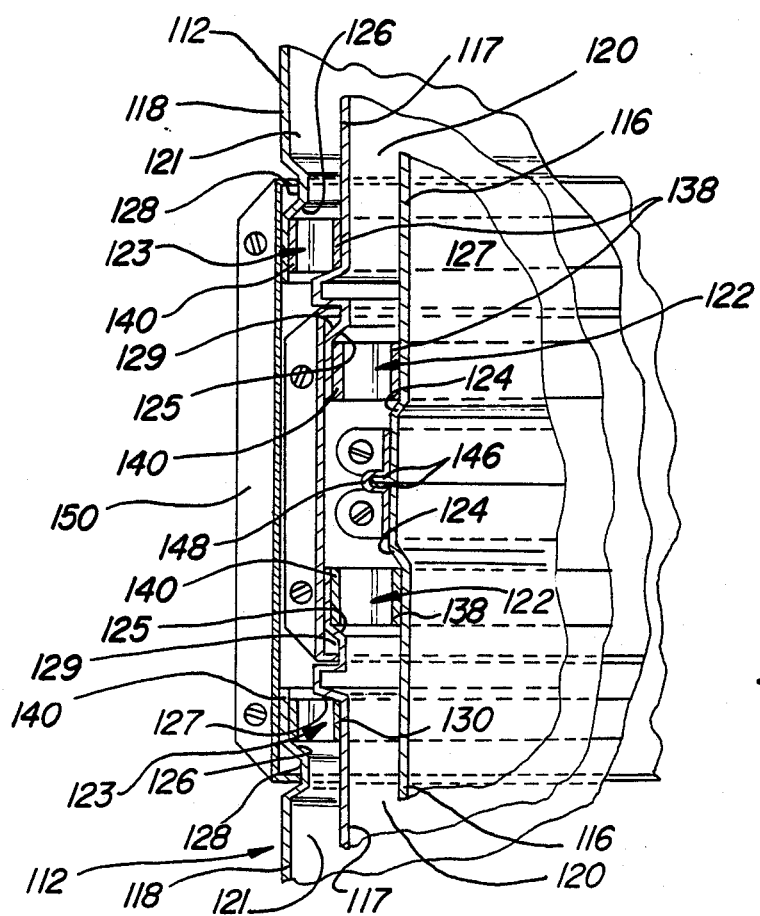
_Fig-9_

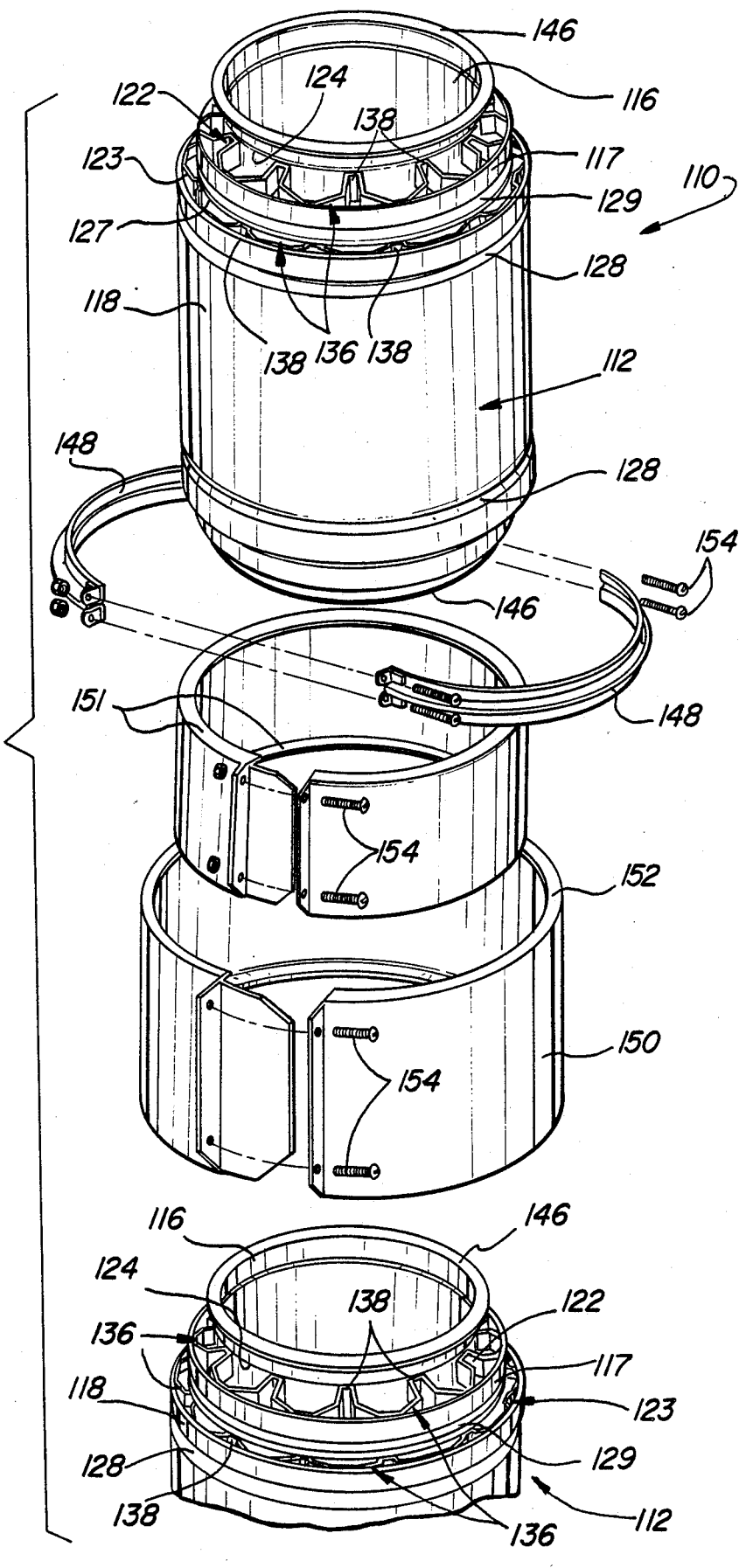

MULTIPLE WALLED CHIMNEY

BACKGROUND OF THE INVENTION

I. Field of the Invention

This invention relates to a multiple wall chimney formed of a plurality of chimney sections connected together and, in particular, to an expansible spacer ring positionally captured between the walls of the chimney sections to maintain the flow-through spacing of the walls.

II. Description of the Prior Art

Double-walled metal chimneys have been widely used in place of masonry chimneys because of their versatility particularly in joining chimney sections to form the desired chimney length. The double wall reduces heat conduction to the exterior of the chimney permitting the chimney to be mounted without the threat of combustion of supporting materials. The double wall also ensures that smoke and gases are vented through the chimney even if some leakage occurs through the inner wall. Spacer members are mounted between the walls so as to minimize heat conduction from the inner wall to the outer wall while also not blocking the annulus therebetween to allow the flow of gases upwardly through the annulus.

The chimney sections are normally constructed by positioning the spacer elements between the wall segments and securing the elements to the inner and outer walls. The spacers may be spot welded, riveted, or bolted to the wall segments. However, the secured spacer elements do not provide any leeway for expansion and contraction during operations. Moreover, attachment of the individual spacer elements raises the cost of production.

As a substitute for the individual spacer elements, spacer rings have been developed for insertion between the walls of the chimney sections. Such spacer rings may be an annular ring with spacer elements attached thereto or cut and bent out of the ring itself During assembly, the ring is secured between the wall sections in much the same manner as the individual elements. Although simplifying manufacture by incorporating the spacer members into a ring for simultaneous insertion, manufacturing costs are not substantially reduced since the spacer ring must still be secured between the walls to prevent longitudinal shifting.

Corrugated or sinusoidal spacer bands have also been developed to maintain the spacing between wall sections. Typically, these spacers are formed of a continuous band having its ends joined to form a ring. The corrugated spacer ring is thereafter secured between the walls by spot welding the peaks of the spacer to the wall which they contact. Although simplifying positioning, manufacturing costs are not substantially reduced since the ring must be secured to the wall sections. The ring also does not allow for expansion and contraction in relation to the wall sections. However, the strength of the corrugated spacer ring is greater than the other spacer means thereby providing structural strength to the double-walled chimney.

SUMMARY OF THE PRESENT INVENTION

The present invention overcomes the disadvantages of the prior art by providing a multiple walled chimney construction with a spacer ring that is positionally captured between the wall segments to simplify manufacture while allowing expansion and contraction during use.

The chimney construction according to the present invention includes a plurality of chimney sections axially connected to form the desired chimney length and configuration. Each of the chimney sections has two or more concentric walls which are spaced apart by at least one spacer ring positionally captured between the walls. The inner and outer walls between which the ring is positioned include annular shoulders to prevent longitudinal movement of the ring. These shoulders formed in the walls also facilitate attachment of the connecting clamps used to secure adjacent chimney sections.

In a preferred embodiment, each of the chimney sections includes a pair of spacer rings positionally captured within the annulus between concentrically adjacent walls. The rings have a substantially corrugated configuration with inner and outer contact surfaces which engage the inner and outer wall, respectively. The rings are constructed of a continuous band with a plurality of substantially identical corrugated conformations. The ends of the band may be joined in overlapping relationship to allow expansion of the ring while forming the final conformation. Since the ends of the ring are not secured and the ring is not secured to the walls, the ring is free to expand and contract in response to heating and cooling of the chimney. Alternatively, the ends of the band may be joined by a spot weld or the like to form an integral ring. Moreover, by providing minimal, spaced-apart contact points, conduction from the inner wall to the outer wall is minimized. However, the configuration of the individual corrugations provides the structural strength to ensure proper spacing between the walls.

Other objections, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an elevated perspective of a first embodiment of the multiple walled chimney of the present invention;

FIG. 2 is an exploded view of the first embodiment showing the chimney sections separated;

FIG. 3 is an end plan view of the chimney sections of the first embodiment;

FIG. 4 is a cross-sectional perspective of the multiple walled chimney of the first embodiment;

FIG. 5 is an enlarged sectional view taken of the encircled area 5 of FIG. 3;

FIG. 6 is an enlarged sectional view taken of the encircled area of FIG. 4;

FIG. 7 is an end plan view of one of the chimney sections of a second embodiment of the present invention;

FIG. 8 is an exploded view of the second embodiment showing the chimney sections separated; and FIG. 9 is an enlarged sectional view of the clamping arrangement of the second embodiment.

DETAILED DESCRIPTION OF A PREFERRED EMBODIMENT OF THE PRESENT INVENTION

The present invention is directed to a multiple walled prefabricated metal chimney stack which is made up of a plurality of chimney sections joined in end-to-end axial alignment. The joined chimney sections form a central flue through which a majority of the heat and combustion is directed and one or more annulus around the central flue to insulate the chimney stack and direct any gases which leak from the flue upwardly through the chimney. The present invention contemplates two primary embodiments which will be described herein: a double-walled chimney stack shown in FIGS. 1 through 6 and a triple-walled chimney stack shown in FIGS. 7 through 9. Although only these two embodiments are shown and described, it is contemplated that any number of walls could conceivably be utilized to form the chimney of the present invention.

Referring first to FIGS. 1 through 6, there is shown a double walled chimney stack 10 embodying the present invention. The chimney stack 10 is formed of a plurality of chimney sections 12 joined together in axial alignment. The number of chimney sections 12 used to form the stack 10 depends upon the desired length of the finished stack 10. Once assembled, the chimney sections 12 form a central flue 14 through which the heat and combustion are exhausted.

The individual chimney sections 12 of the double-walled chimney stack 10 include an inner wall member 16 and an outer wall member 18. The outer wall member 18 has a greater diameter than the inner wall member 16 and is positioned in spaced apart concentric relationship to the inner wall 16 to form an annulus 20 therebetween. The annulus 20 acts to insulate the inner flue 14 from the outer periphery of the chimney 10 and the supporting structure as well as providing a secondary passageway to direct any exhaust gases up through the chimney 10. Exhaust which leaks from the flue 14 between the chimney sections 12 will be captured within the annulus 20 and directed upwardly. The inner wall member 16 and the outer wall member 18 of the chimney section 12 are maintained in spaced apart relationship by at least one spacer ring 22. In a preferred embodiment, each double-walled chimney section 12 includes a pair of spacer rings 22, one disposed proximate each end of the chimney section 12. The spacer rings 22 are not attached to either of the wall members but rather are positionally captured within the annulus between the inner wall member 16 and the outer wall member 18 to simplify assembly while facilitating expansion and contraction of the spacer 22 independent of the wall members.

Referring more specifically to FIGS. 4 and 6, the spacer rings 22 are prevented from moving longitudinally within the annulus 20 by annular shoulders formed in the wall members 16 and 18. In a preferred embodiment, the inner wall member 16 includes outwardly extending annular shoulder 24 and the outer wall member is includes inwardly extending annular shoulder 26. When the chimney section 12 is assembled, the spacer rings 22 are positionally captured between the shoulders 24 and 26. To facilitate assembly, the annular shoulder 24 of the inner wall member 16 is positioned longitudinally outwardly of the spacer ring 22 while the shoulder 26 of the outer wall member 18 is positioned longitudinally inwardly of the spacer ring 22. Of course, it is to be understood that additional shoulders may be provided or repositioned to provide additional support although at an increase in manufacturing costs. The formation of the inwardly extending shoulder 26 of the outer wall 18 creates an annular groove 28 on the exterior of the chimney section 12 which facilitates connection of the chimney sections 12 as will be subsequently described.

Referring now to FIGS. 3 and 5, the spacer ring 22 is formed from a continuous band having its ends 30 and 32 overlapped to form a seam 34. The ends 30 and 32 are not attached to the wall members to allow circumferential expansion and contraction of the spacer ring 22. In a preferred embodiment, the ends 30 and 32 of the spacer ring 22 are secured to each other, such as by spot welding, to form a substantially integral and continuous spacer ring 22. However, it is to be understood that the ends 30 and 32 may merely overlap each other to provide for expansion and contraction. The spacer ring 22 includes a plurality of corrugations 36 having a configuration which provides the necessary strength and support to maintain separation. The corrugations 36 are integrally connected and separated by a substantially planar segment 38 adapted to engage the inner wall member 16. The preferred configuration of the individual corrugations 36 includes an intermediate segment 40 which engages the outer wall member 18, a pair of outer segments 42 extending from the planar segments 38 substantially perpendicular to the inner wall member 16, and a pair of connecting segments 44 extending between the ends of the intermediate segment 40 to the ends of the outer segments 42. The length of the outer segments 42 is less than the width of the annulus 20 such that the connecting segments 44 do not engage the outer wall member 18. As best shown in FIG. 5, the overlapping ends 30 and 32 of the spacer ring 22 can also be bent into the configuration of the intermediate segment 40 and the connecting segments 44 in order to allow freedom of expansion and contraction.

The individual double-walled chimney sections 12 are assembled simply by positioning the wall members in concentric relationship and pushing the spacer rings 22 into the end of the annulus 20 until the ring 22 passed inwardly of the shoulder 24. The configuration of the spacer rings 22 allows it to be compressed over the shoulder 24. The inwardly extending shoulder 26 will prevent the spacer ring 22 from travelling too far into the annulus 20. When both spacer rings 22 are inserted into the annulus 20 between the shoulders 24 and 26, the outer wall member 18 will be properly aligned and positioned relative to the inner wall member 16.

With the double-walled chimney sections 12 assembled, the sections 12 can be axially joined to form the chimney stack 10. As best shown in FIGS. 2 and 6, a pair of clamps are utilized to join adjacent chimney sections 12. The inner wall member 16 includes an annular flange 46 formed at both ends thereof. The end flanges 46 of adjoining chimney sections 12 are adapted to engage each other in order to form the flue 14. The flanges 46 of adjoining chimney sections 12 are secured together by an inner clamp 48 which fits around the outer edges of the adjoining end flanges 46. An outer band clamp 50 joins the outer wall members 18 while closing the gap between the ends of the outer wall members 18, the outer wall members being shorter than the inner wall members 16. The outer band clamp 50 includes annular flanges 52 which are received in the grooves 28 of the outer wall members 18. Both the inner clamp 48 and the outer clamp 50 can be secured by conventional means such as bolts 54. In the preferred embodiment of the present invention, the inner clamp 48 consists of two identical halves which are secured together around the flanges 46 while the outer band clamp 50 is secured around the outer wall members 18 in only one position.

Referring now to FIGS. 7 through 9, there is shown a triple-walled chimney stack 110 which incorporates many of the features of the double walled chimney described above. However, because of the three spaced-apart walls and the dual annulus, additional spacer rings are necessary. The triple-walled chimney 110 provides added insulation between the flue gases and the supporting structure.

The triple-walled chimney stack 110 is assembled of two or more chimney sections 112 to form a flue 114 for exhaust of combustion gases. Each chimney section 112 includes an inner wall member 116 and an outer wall member 11B plus an intermediate wall member 117. Each of the wall members are disposed in spaced-apart, concentric relationship to form an inner annulus 120 and an outer annulus 121. The intermediate wall member 117 has a diameter greater than the inner wall member 116 to form annulus 120 while the outer wall member 118 has a diameter greater than the intermediate wall member 117 to form the outer annulus 121. In order to maintain the spaced apart relationship of the wall members, each of the annulus 120 and 121 includes a pair of spacer rings positionally captured between the wall members proximate the ends of the chimney section 112. The inner annulus 120 includes spacer rings 122 positionally captured between the inner wall member 116 and the intermediate wall member 117. Similarly, the outer annulus 121 includes spacer rings 123 positionally captured between the intermediate wall member 117 and the outer wall member 118. The spacer rings 122 and 123 have similar configurations although the spacer rings 123 are preferably narrower than the spacer rings 122 because of the narrower width of the outer annulus 121 as compared to the inner annulus 120.

As with the double-walled chimney, the spacer rings 122 and 123 are not secured to the wall members but are prevented from movinq longitudinally within the annulus 120 and 121 respectively by annular shoulders. The spacer rings 122 are prevented from moving longitudinally outwardly by an outwardly extending annular shoulder 124 formed in the inner wall member 116. Similarly, the spacer rings 123 are prevented from moving longitudinally inwardly by inwardly extending annular shoulder 126 formed in the outer wall member 118. To further prevent movement of the spacer rings, the intermediate wall 117 includes a double annular shoulder formed therein. The double shoulder includes an inwardly extending annular portion 125 which prevents the spacer rings 122 from moving longitudinally inwardly in annulus 120 and an outwardly extending annular portion 127 which prevents the spacer ring 123 from moving longitudinally outwardly within annulus 121. Thus, spacer rings 122, in addition to being positionally captured between the inner wall member 116 and intermediate wall member 117, are positionally captured between shoulders 124 and 125 while spacer rings 123 are positionally captured between shoulders 126 and 127 as well as being captured between the intermediate wall member 117 and the outer wall member 118. The formation of the annular shoulder 126 creates an annular groove 128 on the exterior of the outer wall member 118 and the formation of shoulder 125 creates an annular groove 129 in intermediate wall member 117. These grooves 128 and 129 facilitate assembly of the chimney sections 112 to form the chimney 110 as will be subsequently described.

Referring now to FIG. 7, the spacer rings 122 and 123 are made of a continuous band with overlapping ends 130 and 132 to form an expansible seam 134. The ends 130 and 132 may be secured to each other or not to provide an expansible seam 134 or to facilitate assembly. In a preferred embodiment, the inner spacer rings 122 have their ends welded together such that the ring 122 must be expanded to mount to the inner wall 116 while the ends of the outer spacer rings 123 are not welded but are maintained in overlapping relation. The spacers include a plurality of integrally formed corrugations 136 separated by substantially planar segments 138 which engage the innermost wall member of the respective annulus. Each of the corrugations 136 include an intermediate segment 140 which engages the outermost wall of the annulus, a pair of side segments 142 having a length less than the width of the annulus, and a pair of connecting segments 144 extending between the ends of the side segments and the ends of the intermediate segment 140.

The chimney sections 112 are joined by engaging annular flanges 146 of adjoining sections 112 and applying an inner clamp 148 around the outer rim of the flanges 146 and secured to form the continuous flue 114. Next, in order to close the gap between the intermediate wall members 117 of adjoining sections, an intermediate band clamp 149 is secured to the outside of the intermediate wall 117. The intermediate band clamp 149 includes flanges 151 which are received in grooves 129 of the intermediate wall members 117. Finally, in order to close the gap between the outer wall members 118 of adjoining sections, an outer band clamp 150 is secured to the outside of the outer wall 118. The outer band clamp 150 includes flanges 152 which are received in grooves 128 of the outer wall members 118. Bolts 154 are used to secure the clamps around the respective wall member.

Thus, the present invention provides an easily assembled multiple walled chimney which insulates the flue from the surrounding support structure. The chimney stack comprises a series of chimney sections which are readily assembled without welding or securing the wall members to each other or the spacer rings to the walls. As a result, the chimney sections are free to expand and contract in response to temperature. By not securing the components, assembly and, if necessary, disassembly of the chimney sections is greatly simplified.

The foregoing detailed description has been given for clearness of understanding only and no unnecessary limitations should be understood therefrom as some modifications will be obvious to the those skilled in the art without departing from the scope and spirit of the appended claims.

I claim:

1. A double-walled chimney section for forming a chimney stack, said chimney section adapted to be joined with a similar chimney section, said chimney section comprising:

an inner wall member and an outer wall member in concentric spaced-apart relationship, said outer wall member having a diameter greater than said inner wall member to form an annulus between said wall members;

at least one spacer ring positionally captured within said annulus to maintain the concentric spaced apart relationship to said inner and outer wall members; and means for preventing longitudinal movement of said at least one spacer ring positionally captured within said annulus;

said spacer ring formed of a continuous band having the ends thereof in overlapping contact and including a plurality of corrugated sections, each of said corrugated sections separated by a substantially planar segment engaging said inner wall and including an intermediate substantially planar segment a pair of outer segments formed perpendicular to said wall members, and a pair of connecting segments extending between said intermediate segment and said outer segments.

2. The chimney section as defined in claim 1 wherein said means for preventing longitudinal movement of said at least one spacer ring includes an inwardly extending annular shoulder formed on said outer wall and an outwardly extending shoulder formed on said inner wall, said at least one spacer ring positionally captured between said annular shoulders.

3. The chimney section as defined in claim 2 wherein said inner wall member has a radially extending flange at each end, adjoining end flanges on adjacent chimney sections being joined by inner clamp means extending around said adjoining end flanges.

4. The chimney section as defined in claim 3 wherein said outer wall member is shorter than said inner wall member such that said adjoining end flanges are exposed for application of said inner clamp means.

5. The chimney section as defined in claim 4 and further comprising outer clamp means extending around said outer wall members of adjacent chimney sections to close the gap between adjacent outer wall members.

6. The chimney section as defined in claim 5 wherein said inwardly extending shoulder of said outer wall member forms a corresponding groove on the outer periphery of said outer wall member, said outer clamp means engaging said grooves on adjacent chimney sections to retain said clamp on said adjacent outer wall members.

7. The chimney section as defined in claim 2 wherein said chimney section includes a pair of spacer rings, one of said spacer rings positionally captured within said annulus proximate each of the ends of said wall members.

8. The chimney section as defined in claim 1 wherein the ends of said continuous band are joined in expansible overlapping contact to form said spacer ring.

9. The chimney section as defined in claim 1 wherein said outer segments have a length less than the width of said annulus such that said connecting segments are disposed at an angle to said intermediate segment.

10. The chimney section as defined in claim 9 wherein said overlapping ends of said spacer ring each have said intermediate segment and said connecting segments.

11. A triple-walled chimney section for forming a chimney stack, said chimney section adapted to be joined with a similar chimney section, said chimney section comprising:

an inner wall member;

an intermediate wall member in concentric spaced apart relationship to said inner wall member, said intermediate wall member having a diameter greater than said inner wall member to form a first annulus between said inner and intermediate wall members;

an outer wall member in concentric spaced apart relationship to said intermediate wall member, said outer wall member having a diameter greater than said intermediate wall member to form a second annulus between said intermediate and outer wall members;

at least one spacer ring positionally captured within each of said first and second annulus to maintain the concentric spaced apart relationship of said wall members; and means for preventing longitudinal movement of said spacer rings positionally captured within said first annulus and second annulus.

12. The chimney section as defined in claim 11 wherein said means for preventing longitudinal movement of said spacer ring includes annular shoulders extending into said first and second annulus, said at least one spacer ring positionally captured between pairs of said shoulders.

13. The chimney section as defined in claim 12 wherein said first and second annulus include a pair of spacer rings positionally captured proximate the ends of said wall members.

14. The chimney section as defined in claim 13 wherein said spacer rings have a plurality of integrally joined corrugated sections to maintain the concentric spaced apart relationship of said wall members.

15. The chimney section as defined in claim 12 wherein said inner wall member has a radially extending flange at each end, adjoining end flanges on adjacent chimney sections being joined by inner clamp means extending around said adjoining end flanges.

16. The chimney section as defined in claim 15 wherein said intermediate wall members on adjacent chimney sections are joined by intermediate clamp means extending around said intermediate wall members of adjacent chimney sections to close the gap between adjacent intermediate wall members.

17. The chimney sections as defined in claim 16 wherein said outer wall members on adjacent chimney sections are joined by outer clamp means extending around said outer wall members of adjacent chimney sections to close the gap between adjacent outer wall members.

18. In a multiple walled chimney formed by joining multiple walled chimney sections in adjoining axial alignment, each of said multiple walled chimney sections having at least two wall members in concentric spaced apart relationship, the outer wall member having a diameter greater than the inner wall member to form an annulus therebetween, at least one spacer ring positionally captured between the wall members to maintain the concentric spaced apart relationship of the wall members, said at least one spacer ring comprising:

a continuous band having the ends thereof joined in an overlapping seam, said band including a plurality of identical corrugations to maintain the spaced apart relationship of the wall members, each of said corrugations being separated from an adjacent corrugation by a planar segment which engages one of the wall members, said corrugations including an intermediate segment which engages the other of the wall members and forms the apex of said corrugation, a pair of outer side segments formed perpendicular to the wall members, and a pair of connecting segments extending between said intermediate segment and said side segments.

19. The apparatus as defined in claim 18 wherein said side segments have a length less than the width of the annulus such that said connecting segments extend at an angle to said intermediate segment forming a frusto-triangular portion of said corrugation.

20. The apparatus as defined in claim 19 wherein said overlapping seam of said spacer ring forms a corrugation, each end of said continuous band including an intermediate segment and at least one connecting segment.

21. The apparatus as defined in claim 20 wherein said at least one spacer ring is positionally captured between the wall members to prevent radial movement and between annular shoulders formed in the wall members to prevent longitudinal movement of said at least one spacer ring.

22. The apparatus as defined in claim 21 wherein each chimney section includes a pair of spacer rings longitudinally spaced apart proximate the ends of the chimney section.

23. The apparatus as defined in claim 18 wherein said overlapping seam is expansible, said ends of said band being free to move with respect to one another.

24. A multiple walled metal chimney comprising:
at least two chimney sections having a cylindrical inner wall member with a radially extending flange at each end, a cylindrical outer wall member in concentric spaced-apart relationship to said inner wall member, said outer wall member having a diameter greater than said inner wall member to form an annulus between said wall m embers, and a pair of corrugated spacer rings positionally captured within said annulus between said wall members proximate the ends of said chimney section, said wall members including annular shoulders extending into said annulus to prevent longitudinal movement of said spacer rings, said shoulders engaging said spacer rings;

said spacer rings including a plurality of corrugations and overlapping ends which form an expansible seam, said corrugations separated by planar segments which engage said inner wall member and include a pair of side wall segments extending perpendicular to said wall members, an intermediate segment which engages said outer wall member, and a pair of connecting segments formed at an angle to said intermediate segments and extending between said intermediate segment and said side wall segments;

an inner clamp means extending around adjoining end flanges of adjacent chimney sections to joint one chimney section with another chimney section in axial alignment, said clamp means including means for securing said inner clamp means; and an outer clamp means extending around said outer wall members of adjacent chimney sections for closing the gap between adjacent outer wall members, said outer clamp means including flanges which are received in annular grooves formed in said outer wall members to facilitate attachment of said outer clamp means, said annular grooves corresponding to said annular shoulders of said outer wall members.

25. The chimney as defined in claim 24 wherein said spacer rings are formed of a continuous band having unattached overlapping ends to form said expansible seam.

* * * * *